United States Patent [19]

Ogihara et al.

[11] Patent Number: 4,693,583

[45] Date of Patent: Sep. 15, 1987

[54] PROGRAMMABLE SHUTTER

[75] Inventors: Masuo Ogihara; Hajime Oda; Yoichi Seki; Hiroshi Yamazaki, all of Yotsukaido, Japan

[73] Assignee: Seikosha Co., Ltd., Tokyo, Japan

[21] Appl. No.: 766,032

[22] Filed: Aug. 15, 1985

[30] Foreign Application Priority Data

Aug. 15, 1984 [JP] Japan ............................ 59-170277

[51] Int. Cl.<sup>4</sup> ............................................ G03B 7/097
[52] U.S. Cl. .................................................. 354/439
[58] Field of Search ............... 354/439, 435, 436, 437, 354/458

[56] References Cited

U.S. PATENT DOCUMENTS

| | | | |
|---|---|---|---|
| 3,903,528 | 9/1975 | Kee | 354/437 |
| 4,005,448 | 1/1977 | Iwata et al. | 354/439 |
| 4,017,872 | 4/1977 | Iwata et al. | 354/439 |
| 4,139,289 | 2/1979 | Yamada et al. | 354/458 X |
| 4,313,656 | 2/1982 | Borowski et al. | 354/435 |

Primary Examiner—W. B. Perkey
Attorney, Agent, or Firm—Bruce L. Adams; Van C. Wilks

[57] ABSTRACT

A programmable shutter of the type wherein a shutter blade is opened and closed by means of a stepping motor. The motor is rotated in a forward direction by drive pulses of a predetermined fixed period to gradually open a sector while at the same time a light measuring circuit is started. Thus, at the time when an appropriate exposure quantity is reached, the direction of rotation of the motor is forcibly reversed to effect closing of the sector to attain simultaneous measurement of light and exposure.

10 Claims, 7 Drawing Figures

FIG. I

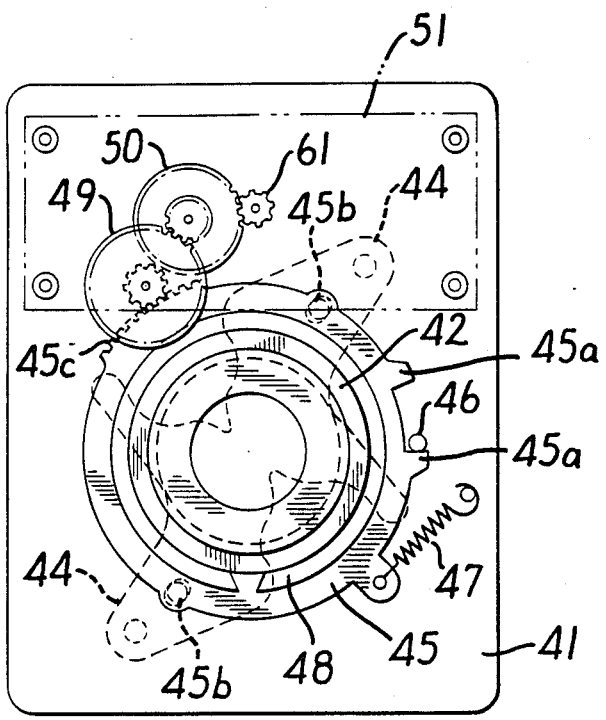 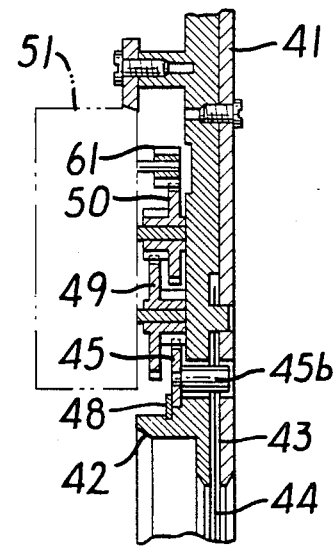
FIG. 4A
FIG. 4B

4,693,583

PROGRAMMABLE SHUTTER

BACKGROUND OF THE INVENTION

1. Technical Field

This invention relates to a programmable shutter, and more particularly to a programmable shutter wherein a set of shutter blades are opened and closed by means of a stepping motor.

2. Prior Art

A programmable shutter wherein a shutter blade is opened and closed by means of a stepping motor is constructed such that driving pulses of a predetermined fixed period are inputted to a stepping motor in response to operation of a release mechanism to rotate the motor in a forward direction to gradually open a shutter sector, and at the time when the shutter sector is pivoted stepwise corresponding to an exposure quantity, the phase of the pulses is reversed to rotate the stepping motor in a reverse direction to close the shutter sector thereby to attain an appropriate exposure.

In general, since the maximum rotational speed of a stepping motor used for such a shutter is so low, on the order of 500 to 1000 pulses per second or so, there are disadvantages that there is a restriction to a minimum time required for each incremental stepwise rotation, and a large error may be caused in the exposure, particularly in the case of short exposure times, or the optimum exposing steps may not be attained. Moreover, due to the advances being made in films of high sensitization in the present days, these have become significant problems.

While such problems can naturally be eliminated by reducing an inclination of an opening line of the shutter or by using a stepping motor which has a high rotational speed, or in other words, has a smaller stepping distance, such solutions will cause other new problems such as complicating the construction of the sector mechanism increasing the cost of the stepping motor.

SUMMARY OF THE INVENTION

The present invention has been made in consideration of such circumstances, and it is an object of the invention to provide a programmable shutter which can make exposure for a short time shorter and can attain finer exposing steps.

The present invention is characterized in that at a time of exposure corresponding to a luminance of an object, the direction of rotation of a stepping motor is forcibly reversed to divide a step finely.

BRIEF DESCRIPTION OF THE DRAWINGS

FIGS. 4A and 4B are a front elevational view and a cross sectional view, respectively, illustrating an example of programmable shutter mechanism to which the present invention can be applied.

DETAILED DESCRIPTION OF PREFERRED EMBODIMENTS

Figure 1:
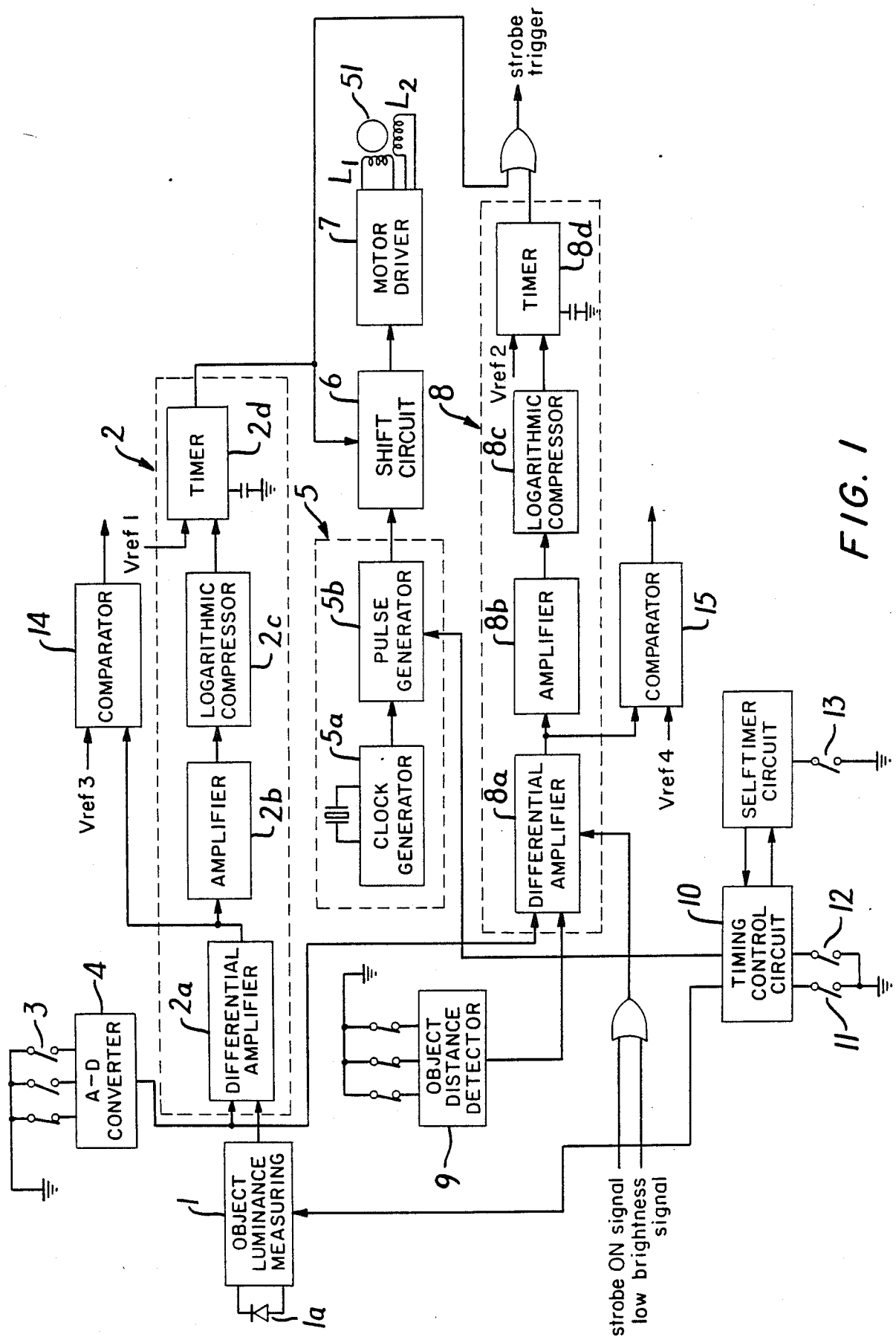
FIG. 1 is a block diagram of a system illustrating an embodiment of the present invention.
Figure 2:
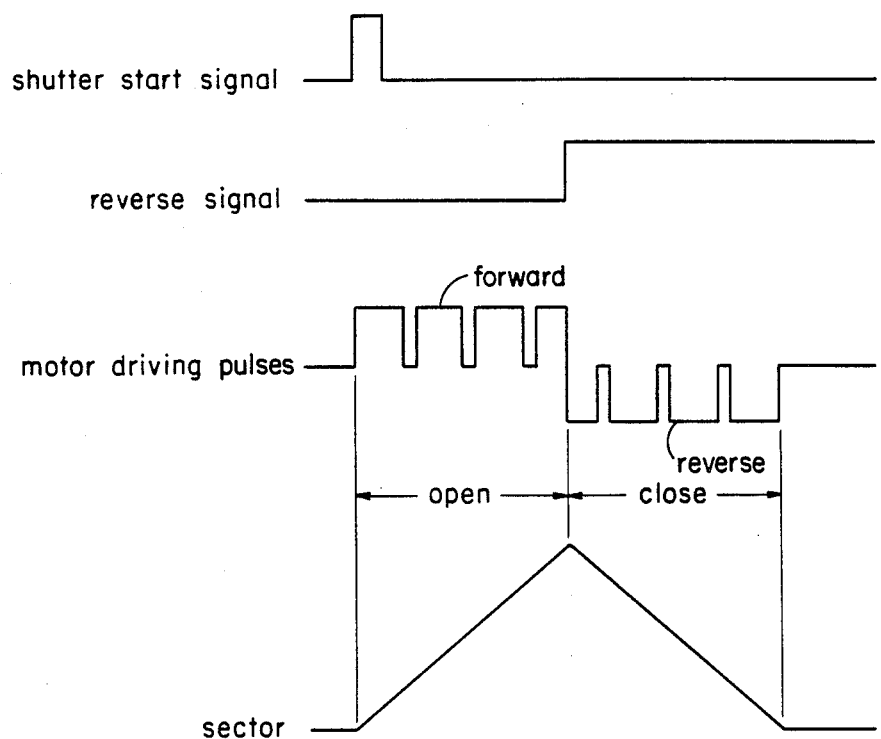
FIG. 2 is a waveform diagram illustrating operations of the system of FIG. 1.

The invention will now be described in detail in connection with preferred embodiments thereof which is illustrated in the accompanying drawings.

FIGS. 4A and 4B illustrate an embodiment of shutter mechanism to which the present invention is applied. In those figures, reference numeral 41 designates a base plate on which a front plate 42 for positioning a lens to an aperture is mounted. A sector chamber 43 is defined between the base plate 41 and the front plate 42, and a pair of shutter sectors 44 are contained in the sector chamber 43. Reference numeral 45 denotes a sector ring for driving the shutter sectors 44 to open and close. The sector ring 45 is mounted for rotation around an outer periphery of the front plate 42 by means of a snap ring 48. Rotation of the sector ring 45 is restricted to a range defined by stoppers 45a formed on an outer periphery thereof and a cooperating pin 46 implanted on the base plate 41, and the sector ring 45 is urged in a counter-clockwise direction by means of a spring 47 extending between the sector ring 45 and the base plate. A pair of sector pins 45b are implanted in symmetrical relationship relative to an optical axis on a face of the sector ring 45 adjacent the base plate 41 so as to engage with the shutter sectors 44. The sector ring 45 has teeth 45c formed on a portion of the outer periphery thereof and is connected to be driven by a pinion 61 of a bidirectional stepping motor 51 which will be hereinafter described via gear wheels 49 and 50.

Figure 5A:
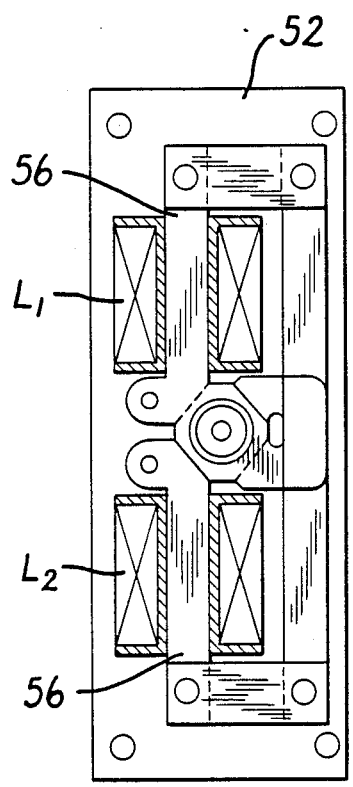
FIGS. 5A and 5B are a front elevational view and a cross sectional view, respectively, illustrating an example of stepping motor which can be used in the shutter mechanism of FIGS. 4A and 4B.
Figure 5B:
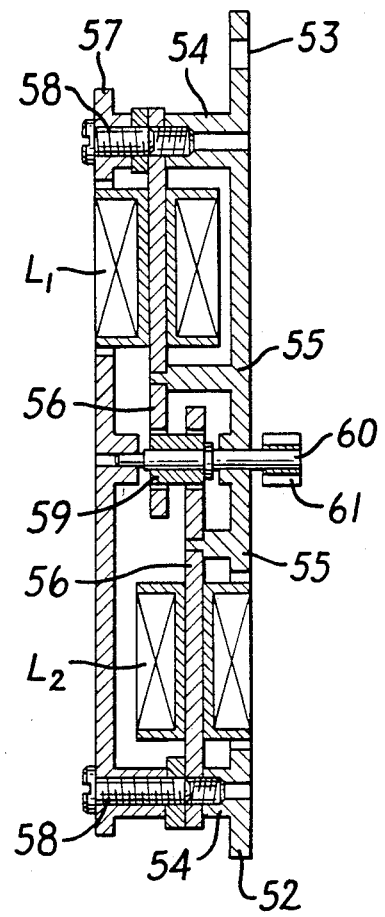

FIG. 5 illustrates an embodiment of the above described stepping motor 51, and reference numeral 52 denotes a motor guide plate which has formed therein mounting holes 53 for engaging the guide plate 52 with the base plate 41 of a shutter body by means of screws. A pair of stators 56 are located in vertically opposing relationship by means of a pair of posts 54 and a pair of guide pins 55 all implanted on a surface of the motor guide plate 52. A motor top plate 57 is secured to the posts 54 by means of screws 58, and a rotor 59 consisting of a permanent magnet is supported for rotation by the motor guide plate 52 and the top plate 57. A rotary shaft 60 extends from an end of the stepping motor 51, and a transmission pinion gear wheel 61 is mounted at an end of the rotary shaft 60. Reference symbols L1 and L2 denote first and second drive coils, respectively, which are wound on the stators 56.

FIG. 1 illustrates an embodiment of shutter mechanism controlling device comprised of an object luminance measuring circuit 1 which logarithmically compresses a current signal corresponding to an object luminance or brightness detected by a light receiving element 1a to output a luminance signal, and an exposure controlling circuit 2 which includes a differential amplifier 2a for calculating a difference between the luminance signal and a signal which is obtained by apex converting film sensitivity information inputted from a film sensitivity detecting portion of a film cartridge or by a manual switch 3 or the like with a digital-analogue converter 4, an amplifier 2a for amplifying a signal from the differential amplifier 2a with a predetermined gain, a logarithmic compressing circuit 2c for converting a signal from the amplifier 2b into a primary function, and a timer circuit 2d for comparing an output signal of the logarithmic compressing circuit 2c with a reference signal Vref1 and for outputting a signal after the lapse of a time corresponding to a difference between the compared signals. Reference numeral 5 denotes a stepping motor driving pulse generator which includes a clock generator 5a having a crystal resonator, and a pulse generator 5b for dividing clock signals from the clock generator 5a to produce 2-phase pulses for driving the stepping motor. Reference numeral 6 denotes a shift circuit such as a ring counter which outputs signals from one after another of the terminals thereof each time a pulse signal is inputted thereto. The shift circuit 6 is constituted to output forward drive pulses in synchronism with 2-phase pulses from the stepping motor driving pulse generator 5 until receipt of a signal from the exposure controlling circuit 2, and then at a time when the signal from the exposure controlling circuit 2 is inputted, the phase of the pulses to be outputted to the motor is forcibly reversed to thus output reverse drive pulses to a motor driver 7. Reference numeral 8 designates a strobe trigger generator which includes a differential amplifier 8a for calculating a difference between the apex converted data from an object distance detector 9 and the film sensitivity data, a logarithmic compressing circuit 8c for converting a signal from the differential amplifier 8a multiplied by a predetermined multiple K' by an amplifier 8b into a linear signal, and a timer 8d for comparing a signal from the logarithmic compressing circuit 8c with a reference signal Vref2 and for outputting a signal after the lapse of a time corresponding to a difference of the compared signals. Reference numeral 10 designates a timing controlling circuit which is constituted to output a signal for operation of the object luminance measuring circuit 1 and for effecting opening of the shutter in response to turning on of a light measuring switch 11 provided on a camera body and a release switch 12 or to effect turning on of a self-timer switch 13 through a self-timer circuit.

Reference numerals 14 and 15 denote comparators for comparing the outputs from the differential amplifiers 2a and 8a with preset values Vref3 and Vref4, respectively, to output a signal for warning of a low luminance or for warning of the impossibility of strobe photographing when the output is lower than the preset value.

In the present embodiment, after a power switch (not shown) is turned on, if a release button on the camera body is depressed to a first depressed position, the light measuring switch 11 is switched on so that the object luminance measuring circuit 1 operates to output a luminance signal to the exposure quantity controlling circuit 2. In the exposure quantity controlling circuit 2, an apex operation between a film sensitivity constituting a reference value and the luminance signal is effected by the differential amplifier 2a, and when there is a likelihood of manual shaking due to inadequate luminance, a low luminance warning is issued. When there is no low luminance warning, if the release button is further depressed to a second position to turn the release switch 12 on, the luminance signal is inputted to the exposure quantity controlling circuit 2, and at the same time, a sector opening signal is outputted from the timing controlling circuit 10 to operate the stepping motor driver 5. Consequently, a series of forward drive pulses are inputted to the stepping motor 51 to rotate the stepping motor 51 in the forward direction to open the shutter sectors. In the process of rotation of the stepping motor in the forward direction to open the sectors in this manner, the exposure quantity controlling circuit 2 effects an apex operation between the film sensitivity and the object luminance with the differential amplifier 2a and thus outputs a reversing signal from the timer circuit 2d after the lapse of a time corresponding to a difference between the signals. As a result, the shift circuit 6 reverses the phase of the pulses outputted therefrom so that the rotational direction of the stepping motor is forcibly reversed. Accordingly, the rotational direction of the shutter sectors is reversed to close the light path, thereby completing the exposure which is optimum relative to the object luminance.

Meanwhile, if the release button is depressed to the second position in a flash mode selected by a flash mode switch (not shown) on the camera body, a shutter start signal is outputted from the timing controlling circuit 10 so that forward driving pulses are outputted from the stepping motor driving pulse generator 5 to open the shutter sectors. At the same time, the strobe trigger generator 8 operates so that a difference between the apex converted data from the object distance detector 9 and the film sensitivity data is calculated by the differential amplifier 8a. The signal representative of the difference is amplified by the predetermined multiple K' by the amplifier 8b and is converted into a linear signal by the logarithmic compressing circuit 8c. The linear signal is compared with the reference signal Vref2 by the timer circuit 8d, and after the lapse of a time corresponding to a difference between the two signals thus compared, a strobe trigger signal is outputted to cause the strobe device (not shown) to emit light therefrom. Since light from the strobe device is received so that the level of a signal of the object luminance measuring circuit 1 is raised suddenly, a signal is outputted from the timer circuit 2d of the exposure quantity controlling circuit 2 to forcibly reverse the pulses from the stepping motor driver 6 to thereby close the shutter sectors.

Figure 3:
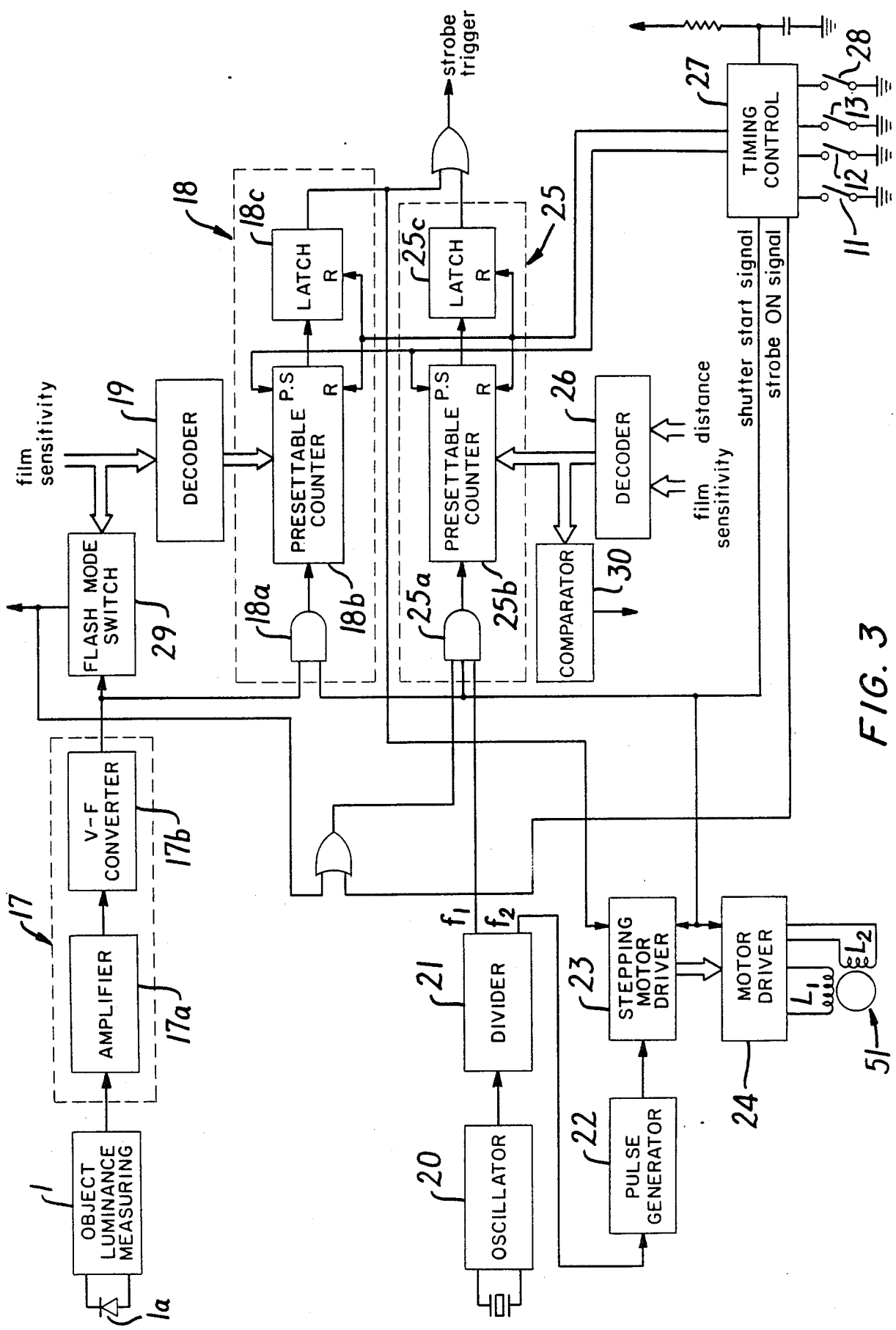
FIG. 3 is a block diagram of a system illustrating another embodiment of the invention.

FIG. 3 illustrates a second embodiment of the present invention, and in FIG. 3, reference numeral 17 designates an object luminance signal generator which includes an amplifier 17a for amplifying by a predetermined gain a signal from an object luminance measuring circuit 1 which develops a voltage proportional to an object luminance detected by a light receiving element 1a, and a voltage-frequency converter 17b for converting the signal from the amplifier 17a into a pulse signal having a frequency proportional to the object luminance. Reference numeral 18 denotes an exposure quantity controlling circuit for determining a point of time at which the shutter sectors are to be reversed. The exposure quantity controlling circuit 18 includes a presettable counter 18b to which a count value is set based on film sensitivity information from a decoder 19 which outputs a value in inverse proportion to film sensitivity information. The presettable counter 18b counts down in response to an object luminance signal inputted thereto via a gate 18a which is opened by a start signal from a timing controlling circuit 27 which will be hereinafter described. The exposure quantity controlling circuit 18 further includes a latch circuit 18c for latching at a point of time when the count of the presettable counter 18b becomes zero to output a control signal.

Reference numeral 21 denotes a divider for dividing clock signals from a reference oscillator 20 including a crystal resonator into a predetermined ratio to output clock signals of frequencies f1 and f2 suitable for driving the presettable counter 18b and a stepping motor 51, respectively. Reference numeral 22 denotes a pulse generator designed to receive clock signals of the frequency f2 from the divider 21 to develop 2-phase pulses. Reference numeral 23 designates a stepping motor driver which includes a shift circuit, such as a ring counter which outputs signals from one after another of the terminals thereof each time a pulse signal is inputted thereto. The stepping motor driver 23 receives 2-phase pulses from the pulse generator 22 and control signals from the exposure quantity controlling circuit 18 and outputs forward drive pulses to a motor drive circuit 24 until the presettable counter 18b counts up. At a point of time when the presettable counter 18b counts up to a preselected count, the stepping motor driver 23 forcibly reverses its outputs in coincidence with the count-up of the counter 18b even during the application of a drive pulse to the motor and thus develops reverse drive pulses to the motor drive circuit 24.

Reference numeral 25 denotes a strobe light emitting timing controlling circuit which includes a presettable counter 25b to which is input light emitting timing data calculated by a decoder 26 from a distance signal from a distance detector (not shown) and also from film sensitivity information. The presettable counter 25b counts down in response to clock signals f1 inputted thereto via a gate 25a which is opened and closed in response to a shutter start signal and strobe on signal. The strobe light emitting timing controlling circuit 25 further includes a latch circuit 25c for latching at a point of time when the count of the presettable counter 25b becomes zero.

Reference numeral 27 denotes a timing controlling circuit as described hereinabove, which is constituted to output a signal for driving the object luminance signal generator 17 and a shutter start signal in response to turning on of a light measuring switch 11 operated in response to a release button provided on a camera body and to effect turning on of a shutter release switch 12 or to effect turning on of a self timer switch 13. The timing controlling circuit 27 further outputs a strobe on signal in response to turning on of a flash mode switch 28.

Reference numeral 29 denotes a manual shake discriminating circuit for comparing film sensitivity information with an object luminance signal to issue a manual shake warning when the object luminance is lower than the film sensitivitity, and 30 a comparator for comparing a signal from the decoder 26 with a reference value to issue a warning that strobe photographing is not possible when the signal from the decoder is lower than the reference value.

In the FIG. 3 embodiment, if a power switch (not shown) is turned on to render the system operative and then the release button is depressed to a first depressed position, the light measuring switch 11 is switched on so that the object luminance measuring circuit 1 operates to cause the object luminance signal generator 17 to output a signal of a frequency which is proportional to the object luminance while at the same time a value which is in inverse proportion to the film sensitivity is preset to the presettable counter 18b of the exposure quantity controlling circuit 18 via the decoder 19. In such a condition, if the release button is further depressed to a second position, a shutter start signal is outputted from the timing controlling circuit 27 so that the pulse generator 22 operates and forward drive pulses for effecting rotation in the forward direction are outputted from the stepping motor driver 23. As a result, the stepping motor 51 is rotated in the forward direction to start opening of the shutter sectors while at the same time, the gate 18a of the exposure quantity controlling circuit 18 becomes open to allow pulses at a frequency proportional to the object luminance to be inputted from the object luminance signal generator 17 to the presettable counter 18b thereby to count down the preset value in the presettable counter 18b. In this manner, the stepping motor 51 continues to rotate in the forward direction in response to pulses from the pulse generator 22. In the process of opening the sectors, the contents of the presettable counter 18b are reduced to zero so that a signal is developed from the latch circuit 18c. As a result, the stepping motor driver 23 reverses the direction of the output pulses thereof, thereby forcibly reversing the direction of rotation of the stepping motor 51 to close the sectors. When the shutter sectors are returned to their initial position to shut a light path, this condition is detected by a detector (not shown) so that a signal is developed from the controlling circuit 27 to thus reset the presettable counter 18b and the latch circuit 18c in preparation for subsequent photographing.

Meanwhile, if the release button is depressed to the second position in a flash mode selected by a flash mode switch 29 provided on a camera body, a shutter start signal is outputted from the controlling circuit 27 so that pulses for the forward direction are outputted from the stepping motor driver 23 to open the sectors. At the same time, the gate 25a becomes open to allow clock signals to be inputted from the divider 21 to the presettable counter 25b to thus decrement the preset value of the presettable counter 25b. When contents of the presettable counter 25b are reduced to zero in the process of opening the shutter sectors in this manner, a strobe trigger signal is outputted from the latch circuit 25c to cause the strobe device (not shown) to emit light. Since the strobe light causes a repeat frequency of signals from the object luminance signal generator 17 to suddenly rise, the contents of the presettable counter 18b are reduced to zero, causing a reversing signal to be developed. In response to the reversing signal, pulses from the stepping motor driver 23 are forcibly reversed, causing the shutter sectors to be closed.

EFFECTS

As apparent from the foregoing description, according to the present invention, while a shutter opening time is calculated from a preset value determined in accordance with a sensitivity of a photograph film and also from an object luminance, a shutter is opened, and after the lapse of the opening time, a stepping motor is forcibly reversed. Accordingly, an exposure quantity can be controlled in real time processing, and hence the shutter operation can be accurately controlled. Besides, memory circuit devices of a large capacity can be eliminated together with the writing of data thereto, resulting in a reduction in the production cost.

What is claimed is:

1. A programmable shutter comprising: a shutter mechanism including a set of sectors defining an aperture for a lens and a stepping motor rotatable in forward and reverse directions in response to forward and reverse driving pulses applied thereto for opening and closing the set of sectors; and a control section including object liminance measuring means for outputting a signal corresponding to the luminance of an object, circuit means responsive to the signal output by the object luminance measuring means for outputting a control signal after the lapse of a time which is in reverse proportion to the luminance of the object, means for generating a series of reference pulse signals of constant frequency, and stepping motor driver means for outputting driving pulses of constant frequency to the stepping motor in synchronism with said series of reference pulse signals and operative to apply forward driving pulses to effect opening of the set of sectors and operative in coincidence with the control signal from said circuit means to forcibly reverse the phase of the driving pulses even during the application of a driving pulse to the stepping motor to thereby apply reverse driving pulses to effect closing of the set of sectors.

2. A programmable shutter according to claim 1; wherein the circuit means includes means responsive to the signal output by the object luminance measuring means for producing output pulses having a frequency proportional to the object luminance, and a presettable counter having means for presetting therein a count value corresponding to a preselected film sensitivity and being operative to count the output pulses and produce the control signal when the number of counted output pulses reaches the count value.

3. A programmable shutter according to claim 2; wherein the circuit means includes a timing control circuit for producing a start signal to effect initiation of the count operation of the presettable counter simultaneously with initiation of rotation of the stepping motor in the forward direction.

4. A programmable shutter for a camera comprising: a set of shutter sectors mounted to undergo displacement in opening and closing directions to define an exposure interval; sector driving means including a bidirectional stepping motor rotationally driveable in forward and reverse directions in response to forward and reverse driving pulses for effecting displacement of the shutter sectors in the opening and closing directions; brightness measuring means for measuring the brightness of an object to be photographed during use of the programmable shutter and producing an output signal corresponding to the measured object brightness; means responsive to the output signal for producing a control signal after a lapse of time which is inversely proportional to the measured object brightness; and stepping motor driving means for applying forward driving pulses of a given phase and constant frequency to the stepping motor to effect forward stepwise rotation thereof and responsive to the control signal to forcibly reverse the phase of the driving pulses in coincidence with the control signal even during the application of a driving pulse to thereafter apply reverse driving pulses of constant frequency to the stepping motor to effect reverse stepwise rotation thereof.

5. A programmable shutter according to claim 4, wherein the brightness measuring means includes means for producing an output signal comprised of output pulses having a frequency proportional to the measured object brightness, and presettable counting means settable to a count value representative of a predetermined film sensitivity and receptive of the output pulses for counting the same and producing the control signal upon counting a number of output pulses equal to the preset count value.

6. A programmable shutter according to claim 5; including timing control means for initiating the application of the forward driving pulses to the stepping motor at the same time as initiating the application of the output pulses to the presettable counting means.

7. A programmable shutter according to claim 4; wherein the means responsive to the output signal comprises a voltage-frequency converter circuit.

8. A programmable shutter according to claim 4; wherein the stepping motor driving means includes means for producing 2-phase pulses of constant frequency, and means responsive to the 2-phase pulses for producing forward and reverse driving pulses.

9. A programmable shutter according to claim 8; wherein the means responsive to the 2-phase pulses comprises a shift circuit.

10. A programmable shutter according to claim 9; wherein the shift circuit comprises a ring counter.

* * * * *